United States Patent Office 2,887,495
Patented May 19, 1959

---

2,887,495

7-CHLORO COUMARINS

Evelyn H. Wilson, Highland Park, N.J., assignor to Johnson & Johnson, a corporation of New Jersey No Drawing. Application September 16, 1957
Serial No. 683,982

3 Claims. (Cl. 260—343.2)

This invention relates to new 7-chloro coumarins which may be illustrated by the formula:

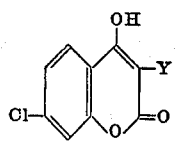

wherein Y is acetyl, or carboethoxy.

A few coumarins have been suggested heretofore as fungicides, including some having a carboethoxy substituent. However, the art is confronted by the problem of providing such materials having markedly enhanced activity without increase in toxicity.

The discoveries associated with the invention and relating to solution of the above problem, and the objects achieved in accordance with the invention as set forth herein include: the provision of new 7-chloro coumarins having markedly enhanced fungicide properties; the provision of new 3-acetyl-4-hydroxy-7-chloro coumarin; the provision of 3-carboethoxy-4-hydroxy-7-chloro coumarin; and other objects which will be apparent as details or embodiments are set forth hereinafter.

In order to facilitate a clear understanding of the invention, the following preferred specific embodiments are described in detail.

EXAMPLE 1

*3-acetyl-4-hydroxy-7-chloro coumarin*

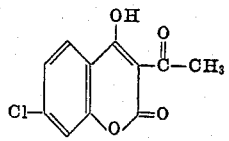

A suspension of sodium ribbon (6.9 grams; 0.3 mol) in 1200 ml. dry toluene was stirred while acetoacetic ester (39 grams; 0.3 mol) was added slowly at room temperature. The mixture was stirred at room temperature until all of the sodium had reacted, and the formation of the sodium salt of acetoacetic ester was complete. To the stirred suspension of the sodium salt of acetoacetic ester, a solution of 4-chlorosalicyl chloride (19.1 grams; 0.3 mol) in 100 ml. of dry toluene was slowly added at room temperature. When the addition of the acid chloride was complete, the reaction mixture was stirred and refluxed 7 hours. The bright yellow solid was filtered, air dried, and dissolved in 2 liters of boiling water. The aqueous solution was clarified by filtration, and the filtrate was acidified with 25 ml. concentrated hydrochloric acid. The crystalline precipitate was filtered, washed well with distilled water and recrystallized from a mixture of chloroform-ethanol (1:3 by volume), (M.P. 179–181° C.) and its chlorine content analysis is:

Theoretical—14.86% by weight.
Observed—15.36.

The overall schematic reaction may be represented as:

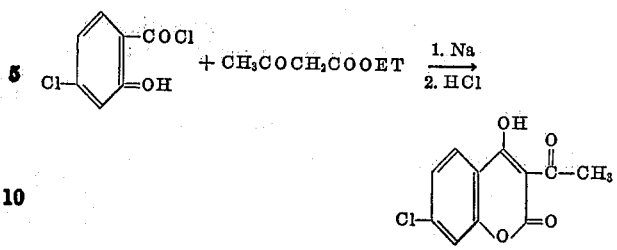

This compound is incorporated as a solid into an agar nutrient at a concentration of 1/100,000, and tested as a fungicide in accordance with the usual procedures.

*Test method*

Organisms:
  Trichophyton purpureum
  Trichophyton mentagrophytes
  Microsporum gypseum
  Trichophyton rubrum
  Epidermaphyton floccosum Saline spore suspensions containing $1 \times 10^6$ spores/ml. were used as inoculum.

Organism controls were prepared for each organism and each test method.

Medium: Kligman's agar.

Concentrations of compound: The concentrations of the compound are calculated on a weight/volume basis, 0.1%, 0.01%, 0.001%.

Replicate plates were prepared for each concentration and each organism.

Technique:

Plates were prepared with the agar containing the desired concentration of the compound. Each plate was then streaked with 0.5 ml. of the inoculum, and each plate was incubated at 26° C. for 7 days. After incubation the plates were examined for relative amounts of growth. Subcultures were made of the negative plates into Kligman's broth. The subcultures were incubated at 26° C. for 7 days. Then they were examined for the presence or absence of growth.

At this concentration, 1/100,000, a fungicidal effect was obtained against *Tr. purpureum*, *Tr. rubrum*, and *E. floccosum*. In a comparative test, using the corresponding (parent) 3-acetyl-4-hydroxy coumarin at this concentration, no fungicidal effect was found against these fungi.

In another test at 1:10,000 concentration, the compound of this example was fungicidal against *Tr. purpureum*, *Tr. rubrum*, *T. mentagrophytes*, *M. gypseum* and *E. floccosum*.

At this concentration the isomeric 8-chloro compound showed no fungicidal effect against *T. mentagrophytes* and *M. gypseum*.

EXAMPLE 2

*3-carboethoxy-4-hydroxy-7-chloro coumarin*

This compound was prepared by the method of Example 1, except using diethyl malonate instead of an acetoacetic ester. The product was crystallized from 95% ethanol (M.P. 159–162° C.) and its chlorine content analysis is:

Theoretical—13.20% by weight.
Observed—13.48.

This material is ten times more active than the parent unsubstituted compound (3-carboethoxy-4-hydroxy coumarin) against all five of the above mentioned organisms. It is ten times more active than the isomeric 5-chloro compound against *Tr. purpureum* and *Tr. mentagrophytes*. The isomeric 6-chloro and 8-chloro compounds have no more activity than the halogen-free parent compound.

In view of the foregoing disclosures, variations or modifications thereof will be apparent, and it is intended to include within the invention all such variations and modifications except as do not come within the scope of the appended claims.

I claim:
1. 3-acetyl-4-hydroxy-7-chloro coumarin.
2. 3-carboethoxy-4-hydroxy-7-chloro coumarin.
3. A compound of the formula

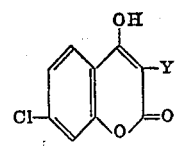

wherein Y is a radical selected from the group consisting of carboethoxy and acetyl radicals.

References Cited in the file of this patent
Ishii: Chem. Abst., 49, p. 5464e (1955).